Figure 1:
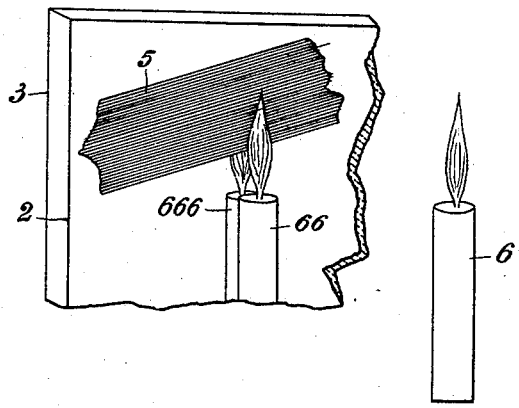

No. 676,272. Patented June 11, 1901.
P. PLAGWITZ.
NON-HALATION PLATE.
(Application filed Mar. 7, 1900.)

(No Model.)

WITNESSES:

INVENTOR
Paul Plagwitz
by Richards & Co
ATTORNEYS

UNITED STATES PATENT OFFICE.

PAUL PLAGWITZ, OF STEGLITZ, GERMANY.

NON-HALATION PLATE.

SPECIFICATION forming part of Letters Patent No. 676,272, dated June 11, 1901.

Application filed March 7, 1900. Serial No. 7,704. (No model.)

*To all whom it may concern:*

Be it known that I, PAUL PLAGWITZ, photographer, a subject of the Emperor of Germany, and a resident of No. 5 Kurzestrasse, Steglitz, near Berlin, in the Empire of Germany, have invented a certain new and useful Improved Non-Halation Plate, of which the following is an exact, full, and clear description.

In all photographic pictures or views of objects which show strong contrasts between light and shaded parts—as, for instance, when photographing light plastic groups in front of a dark background, when photographing architecture, landscape, &c., with unfavorable light; further, when photographing under the clear sky, but especially when photographing inside, when it is necessary to photograph against a window—there are produced by solarization halos effected by total reflection on the rear side of the glass plate or film which is not covered by the sensitized layer. The halos are rendered visible in that the contours of the objects strongly exposed from behind and also the contours of light objects appear on a dark ground to be effaced or completely disappear. When photographing under comparatively favorable conditions for exposure, the formation of solarization is less intense (but always visible) than under the above-mentioned extreme conditions, because the reflecting action of the rear side of the glass plate never ceases. In order to obviate or remove this formation of halos, the rear side of the glass plates is generally covered by a layer or coating of collodion, which is colored in such a manner that the chemically-active rays of light, which are also emitted during total reflection partly into the optically-thinner medium, are absorbed. The solarization is, however, not entirely removed thereby, because of course only a part of the rays of light passes into the optically-thinner medium, whereas the remainder is totally reflected. Since collodion forms a flat or even layer or coating on the glass plate, within which total reflection again takes place, the total reflection for the major part of the rays of light cannot be prevented when collodion is used. Irrespective of this fact the amateur and even the average photographer can only with difficulty provide or back the glass plate with a coating of thin liquid collodion, because the collodion has a tendency to flow over the edges to the film side, whereby the plate itself is liable to be damaged. Moreover, the coating or backing of the plate with colored collodion does not render it possible to protect special or individual parts of the glass plate against solarization. In order to effectively exclude solarization in photographic plates, the glass plates must be provided with such a coating which, in the first place, can be readily provided by any photographer without damaging the plate; secondly, permits when developing the employed red rays of light to pass through into the dark chamber without hindrance; thirdly, may be quickly and easily removed from the plate in order that during copying the same may receive a perfectly transparent rear side, and finally possesses, in an optical sense or respect, the great advantage that it prevents as far as possible the total reflection and absorbs the chemically-active rays which are emitted from the glass plate. With a refractive index of the same or a larger amount than that of the glass the backing therefore must have the property of making the rear side of the glass plate rough. The rear side of the photographic plate then appears covered by a very large number of small pyramids, which with the same or greater refractive power than the glass possesses afford the incident rays such inclined surfaces that total reflection is only possible with a very small number of rays. In order that the backing may be capable of absorbing the emitted chemically-active rays, its color must practically correspond to the tones of color or their mixed color inclosed by the lines D to A of the solar spectrum. The said requirements are best fulfilled in a mechanical respect or sense by employing a lacquer which dries quickly—namely, a spirit lacquer or varnish mixed with any suitable kind of ether—to which varnish in order to give it greater consistency and render it easily removable such substances as potato starch, gum-tragacanth, gum-arabic, and the like are added, which cannot be dissolved by alcohol and which give the whole mixture the character of an emulsion. In order to meet the optical requirements, the varnish or lacquer, whose base elements or ingredients may be sandarac, shellac, and the like, is in the first place colored with aurantia, eosin, or a similar coloring-matter, and then such volatile oils—namely, cassia-oil, clove-oil, aniseed-oil, and the like—are added thereto, which have the advantage of possessing a great power of dispersing and refracting light.

It is evident that any mixing proportions may be adopted without departing from the spirit of this invention.

In the accompanying drawings is shown the action of the non-actinic backing in connection with a photographic plate.

Figure 2:
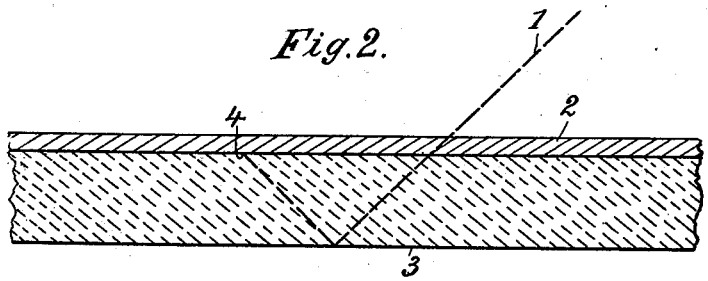
Figure 3:
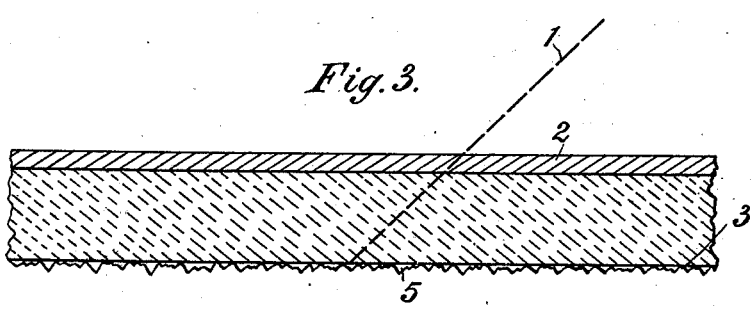

Figure 1 shows a piece of a photographic plate which is partly provided with the non-actinic backing and shows the action of the same. Fig. 2 shows the cross-section of a phothographic plate, on a large scale, without non-actinic backing and the reflection caused thereby of the incident ray onto the sensitized layer and the solarization produced thereby. Fig. 3 shows a similar cross-section of a photographic plate with non-actinic backing and the reflection prevented by the latter of the incident ray and prevention of solarization.

As shown in Fig. 2 of the drawings, in connection with an ordinary plate not provided on the rear side with the non-actinic backing, the incident ray 1 after it has penetrated the sensitized layer 2 and acted thereon chemically is reflected from the rear side 3 of the plate and meets again the sensitized layer at another point 4 and also acts here chemically, whereby solarization is produced. If, however, as shown in Fig. 3, the rear side of the plate is coated with the non-actinic backing, the incident ray 1, Fig. 3, is not reflected at the rear side of the plate, but dispersed by the non-actinic backing 5, thereby preventing solarization. This is shown in Fig. 1 by a practical example. The flame 6 sends rays through a lens (not shown) upon the sensitized layer 2 and produces here the picture 66. At the same time a part of the rays penetrates the layer 2 and produces here the picture 6. At the same time a part of the rays penetrates the layer 2 and produces a picture on the back 3 of the plate, which by reflection produces a second picture 666 on the front 2 of the plate, whereby solarization is caused. Only with that part of the plate provided with the non-actinic backing 5 the second picture, and consequently solarization, are prevented.

Having now particularly described and ascertained the nature of the said invention, I declare that what I claim, and wish to secure by Letters Patent, is—

An improved photographic plate or film, having a coating, which is readily removable, transparent in red light and which possesses the same or a greater power of refracting light than the glass, such coating preventing, in consequence of its roughness, the total reflection of the light on the rear side of the glass plate and possessing such a coloring that it can absorb the chemically-active rays, which are emitted through the glass plate or film, substantially as described and for the purpose set forth.

In witness whereof I have hereunto set my hand in presence of two witnesses.

PAUL PLAGWITZ.

Witnesses:
 WOLDEMAR HAUPT,
 HENRY HASPER.